US012673463B2

(12) United States Patent (10) Patent No.: US 12,673,463 B2

Hao et al. (45) Date of Patent: Jul. 7, 2026

(54) 3D PRINTING NOZZLE, 3D PRINTER AND PRINTING METHOD

(71) Applicant: JF POLYMERS (SUZHOU) CO., LTD., Suzhou (CN)

(72) Inventors: Mingyang Hao, Suzhou (CN); Xiaofan Luo, Suzhou (CN)

(73) Assignee: JF POLYMERS (SUZHOU) CO., LTD., Changshu (CN)

( * ) Notice: Subject to any disclaimer, the term of this patent is extended or adjusted under 35 U.S.C. 154(b) by 83 days.

(21) Appl. No.: 18/116,769

(22) Filed: Mar. 2, 2023

(65) Prior Publication Data

US 2024/0190070 A1 Jun. 13, 2024

Related U.S. Application Data

(63) Continuation of application No. PCT/CN2022/137887, filed on Dec. 9, 2022.

(51) Int. Cl.
| | |
|---|---|
| *B29C 64/264* | (2017.01) |
| *B29C 64/118* | (2017.01) |
| *B29C 64/209* | (2017.01) |
| *B33Y 10/00* | (2015.01) |
| *B33Y 30/00* | (2015.01) |

(52) U.S. Cl.
CPC .......... *B29C 64/264* (2017.08); *B29C 64/209* (2017.08); *B33Y 30/00* (2014.12); *B29C 64/118* (2017.08); *B33Y 10/00* (2014.12)

(58) Field of Classification Search
CPC .... B29C 64/209; B29C 64/295; B29C 64/118
See application file for complete search history.

(56) References Cited

U.S. PATENT DOCUMENTS 11,135,771 B1 * 10/2021 Reith .................... B29C 64/364

FOREIGN PATENT DOCUMENTS

| CN | 103240883 A | 8/2013 |
|---|---|---|
| CN | 205112420 U | 3/2016 |

(Continued)

OTHER PUBLICATIONS

CN216506774U_Machine Translation (Year: 2022).*
SR Optics_Mica (Year: 2018).*
CN210733294U-Machine Translation (Year: 2020).*

*Primary Examiner* — Yunju Kim

(74) *Attorney, Agent, or Firm* — Scully, Scott, Murphy & Presser, P.C.

(57) ABSTRACT

A 3D printing nozzle, a 3D printer and a printing method are provided. The 3D printing nozzle includes a nozzle body to convey and extrude a printing material along a target direction, and sequentially includes at least a preheating section, a first heat resistance section, and a melting section along the target direction; and a heating device connected to the nozzle body. During operation, the heating device heats the preheating section to a temperature T1, and the melting section to a temperature T2. The printing material remains solid when passing through the preheating section at the temperature of T1; the printing material turns into a fluid state when passing through the melting section at the temperature T2, The first heat resistance section restricts the heat conduction between the preheating section and the melting section, so that the printing material in the preheating section remains in the solid state.

14 Claims, 4 Drawing Sheets

(56)         References Cited

FOREIGN PATENT DOCUMENTS

| | | | | |
|------|-------------|-----|---|---------|
| CN   | 205185327   | U   |   | 4/2016  |
| CN   | 108430740   | A   |   | 8/2018  |
| CN   | 110039765   | A   |   | 7/2019  |
| CN   | 110293676   | A   |   | 10/2019 |
| CN   | 210733294   | U   | * | 6/2020  |
| CN   | 113001971   | A   |   | 6/2021  |
| CN   | 215620018   | U   |   | 1/2022  |
| CN   | 216506774   | U   |   | 5/2022  |
| JP   | 6454814     | B1  |   | 1/2019  |
| KR   | 20200063369 | A   |   | 6/2020  |

* cited by examiner

Figure 4:
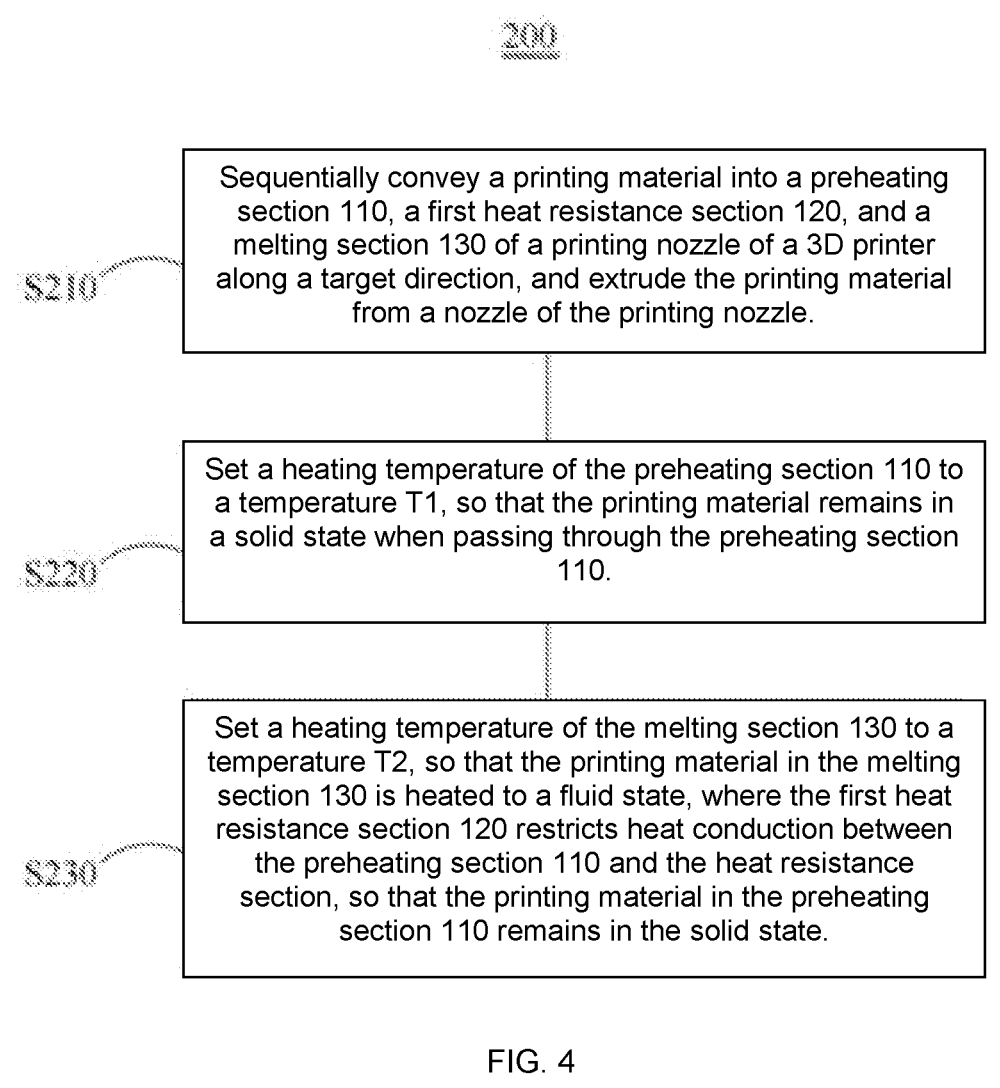

200

| |
|---|
| Sequentially convey a printing material into a preheating section 110, a first heat resistance section 120, and a melting section 130 of a printing nozzle of a 3D printer along a target direction, and extrude the printing material from a nozzle of the printing nozzle. |

S210

| |
|---|
| Set a heating temperature of the preheating section 110 to a temperature T1, so that the printing material remains in a solid state when passing through the preheating section 110. |

S220

| |
|---|
| Set a heating temperature of the melting section 130 to a temperature T2, so that the printing material in the melting section 130 is heated to a fluid state, where the first heat resistance section 120 restricts heat conduction between the preheating section 110 and the heat resistance section, so that the printing material in the preheating section 110 remains in the solid state. |

3D PRINTING NOZZLE, 3D PRINTER AND PRINTING METHOD

RELATED APPLICATION

This application is a continuation of PCT/CN2022/137887, filed on Dec. 9, 2022, and the contents of the foregoing document are incorporated herein by reference in their entirety.

TECHNICAL FIELD

The present application relates to the technical field of 3D printing, in particular to a 3D printing nozzle, a 3D printer and a printing method.

BACKGROUND 3D printing is a rapid prototyping technology, also known as additive manufacturing. It is a technology to construct objects by printing layer by layer based on digital model files.

3D printing is usually realized by using a 3D printer. Material-Extrusion Based 3D printing (ME-3DP) is one of the mainstream forms of the polymer material additive manufacturing technology. In the ME-3DP technology, Fused Filament Fabrication (FFF) is one of the mainstream technical forms thereof. Its principle is to melt a polymer material (usually in the form of a filament) at a high temperature with the printing nozzle of a 3D printer, so that the polymer material can obtain melt fluidity, and then the polymer material is extruded from the printing nozzle in a certain metering manner and then accumulated layer by layer so as to form a product.

However, the low printing speed of the FFF technology has increasingly become a difficulty and pain issue for its industrial application. The extrusion efficiency of the print head of a 3D printer is one of the core technical bottlenecks that limit the increase in the printing speed of FFF.

BRIEF SUMMARY

The present application provides a 3D printing nozzle, a 3D printer and a printing method, which can effectively improve the extrusion efficiency of the 3D printing nozzle.

To achieve the above object, embodiments of the present application employ the following technical solutions:

In a first aspect, the embodiments of the present application provide a 3D printing nozzle, including:

a nozzle body, conveying and extruding a printing material along a target direction during operation, and sequentially including at least a preheating section, a first heat resistance section, and a melting section along the target direction; and a heating device, connected to the nozzle body to heat, during the operation, the preheating section to a temperature T1 and the melting section to a temperature T2, where the printing material remains in a solid state when passing through the preheating section at the temperature T1, it, and turns into a fluid state when passing through the melting section at the temperature T2, and the first heat resistance section restricts heat conduction between the preheating section and the fusing section, so that the printing material in the preheating section remains in the solid state.

The 3D printing nozzle provided in the embodiments of the present application restricts the heat conduction between the preheating section and the melting section by providing a heat insulation section. Accordingly, it can effectively keep the preheating section and the melting section at their respective heating temperatures, thereby realizing segmental heating of the printing filament. The preheating section preheats the printing material, and its set heating temperature is T1. At this temperature, the printing material has a raised temperature, yet still remains in a solid state, so that the printing material is effectively heated, while ensuring the solid conveyance thereof. In addition, this can effectively avoid the material in the melting section from overflowing from the nozzle and flowing back into the preheating section when the 3D printing nozzle is retracted in an idling state. When the printing material is conveyed to the melting section, since its temperature has been previously raised, the heat absorption and melting time required for the printing material per unit mass to be heated and melted in the melting section can be reduced, thereby improving the melting efficiency of the printing material.

According to some embodiments of the present application, the printing material is a semi-crystalline polymer with a crystallinity of greater than 0; the semi-crystalline polymer has a maximum melting point of Tm; and the T1, T2, and Tm satisfy the following relationship: $T1 < Tm \leq T2$.

According to some embodiments of the present application, the printing material is a non-crystalline polymer; the non-crystalline polymer has a maximum glass transition temperature of Tg; and the T1, T2, and Tg satisfy the following relationship: $T1 < Tg \leq T2$.

According to some embodiments of the present application, the printing material includes one or more of the following materials: polylactic acids, polyamides, polyethylene terephthalates, polyolefins, thermoplastic polyesters, polycarbonates, polyurethanes, polyphenylene sulfides, polyphenylene oxides, polyoxymethylenes, polysulfones, polyimides, polyetherether ketones, liquid crystal polymers, and copolymers of the foregoing.

According to some embodiments of the present application, the heating device is a resistance heater, a radiation heater, or an electromagnetic heater.

According to some embodiments of the present application, the heating device includes: a first heating device, connected to the preheating section, and configured to heat the preheating section to the temperature T1; and a second heating device, connected to the melting section, and configured to heat the melting section to the temperature T2.

According to some embodiments of the present application, outer diameters of two ends of the first heat resistance section are larger than an outer diameter of a middle portion of the first heat resistance section; and the two ends of the first heat resistance section are respectively connected to the preheating section and the melting section.

According to some embodiments of the present application, a thermal conductivity of the first heat resistance section is lower than a thermal conductivity of the preheating section and lower than a thermal conductivity of the melting section.

According to some embodiments of the present application, a difference between the thermal conductivity of the first heat resistance section and the thermal conductivity of the melting section is greater than or equal to 10 W/m·K.

According to some embodiments of the present application, a difference between the thermal conductivity of the first heat resistance section and the thermal conductivity of the melting section is greater than or equal to 50 W/m·K.

According to some embodiments of the present application, a difference between the thermal conductivity of the first heat resistance section and the thermal conductivity of the melting section is greater than or equal to 100 W/m·K.

According to some embodiments of the present application, a material of the first heat resistance section includes one or more of inorganic non-metallic materials and organic polymer materials According to some embodiments of the present application, materials of the preheating section and the melting section include one or more of metal materials, metal alloys, and carbon materials.

According to some embodiments of the present application, the material of the first heat resistance section includes one or more of the following materials: marble, glass, and ceramics; and the materials of the preheating section and the melting section include one or more of the following materials: copper, copper alloys, aluminum, aluminum alloys, and carbon materials.

According to some embodiments of the present application, a length of the first heat resistance section is greater than or equal to 1 mm.

According to some embodiments of the present application, a length of the first heat resistance section is greater than or equal to 2 mm.

According to some embodiments of the present application, the nozzle body further includes a conveying section and a second heat resistance section connected sequentially along the target direction, where the second heat resistance section is connected to the preheating section, and when the 3D printing nozzle is in the operation, the printing material is sequentially conveyed through the conveying section, the second heat resistance section, the preheating section, the first heat resistance section, and the melting section, and is finally extruded from an outlet.

According to some embodiments of the present application, the conveying section and the second heat resistance section are connected by a heat dissipation section; and a heat dissipation device is connected to the heat dissipation section.

According to some embodiments of the present application, outer diameters of two ends of the second heat resistance section are larger than an outer diameter of a middle portion of the second heat resistance section; and two ends of the second heat resistance section are respectively connected to the preheating section and the heat dissipation section.

In a second aspect, the embodiments of the present application provide a 3D printer, and the 3D printer includes the 3D printing nozzle according to any embodiments in the first aspect.

The 3D printer provided in the embodiments of the present application employs the 3D printing nozzle set forth in any embodiment of the first aspect; accordingly it can reduce the heat absorption and melting time required for the printing material per unit mass to be heated and melted in the melting section, while maintaining the solid conveyance of the printing material, thereby improving the melting efficiency of the printing material.

In a third aspect, the embodiments of the present application provide a printing method of a 3D printer, including:

sequentially conveying a printing material into a preheating section, a first heat resistance section, and a melting section of a printing nozzle of a 3D printer along a target direction, and extruding the printing material from a nozzle of the printing nozzle;

setting a heating temperature of the preheating section to a temperature T1, so that the printing material remains in a solid state when passing through the preheating section; and setting a heating temperature of the melting section to a temperature T2, so that the printing material is transformed into a fluid state at the temperature T2, where the first heat resistance section restricts heat conduction between the preheating section and the melting section, so that the printing material in the preheating section remains in the solid state.

According to the printing method of a 3D printer provided in the embodiments of the present application, the printing material is preheated in the preheating section, and the heating temperature set for the corresponding heating device is T1. At this temperature, the printing material has a raised temperature, yet still remains in a solid state, so that the printing material can be conveyed in a solid state before entering the melting, which can effectively avoid the material in the melting section from overflowing from the nozzle and flowing back into the preheating section when the 3D printing nozzle is retracted in an idling state. When the printing material is conveyed to the melting section, since its temperature has been previously raised, the heat absorption and melting time required for the printing material per unit mass to be heated and melted in the melting section can be reduced, thereby improving the melting efficiency of the printing material. In addition, a first heat resistance section is provided between the preheating section and the melting section. As a result, the preheating section and the melting section can be effectively maintained at their respective heating temperatures, and the heating temperatures of the preheating section and the melting section are prevented from influencing each other, thereby accurately realizing segmental heating of the printing filament.

According to some embodiments of the present application, the printing material is a semi-crystalline polymer with a crystallinity of greater than 0; the semi-crystalline polymer has a maximum melting point of Tm; and the T1, T2, and Tm satisfy the following relationship: $T1 < Tm \leq T2$.

According to some embodiments of the present application, $5°\,C. \leq (Tm - T1) \leq 50°\,C.$ According to some embodiments of the present application, the printing material includes one or more of the following materials: polylactic acids, polyamides, polyethylene terephthalates, polyolefins, thermoplastic polyesters, polycarbonates, polyurethanes, polyphenylene sulfides, polyphenylene oxides, polyoxymethylenes, polysulfones, polyimides, polyetherether ketones, liquid crystal polymers, and copolymers of the foregoing.

According to some embodiments of the present application, the printing material is a non-crystalline polymer; the non-crystalline polymer has a maximum glass transition temperature of Tg; and the T1, T2, and Tg satisfy the following relationship: $T1 < Tg \leq T2$.

BRIEF DESCRIPTION OF THE DRAWINGS

To further illustrate the technical solutions in the embodiments provided in the description, the drawings that need to be used in the description of the embodiments will be briefly described. Apparently, the drawings in the following description are merely some exemplary embodiments of the present application, and a person skilled in the art can also obtain other drawings according to these drawings without creative efforts.

FIG. 4 is a flowchart of a printing method provided by an embodiment of the present application.

DETAILED DESCRIPTION

Figure 1:
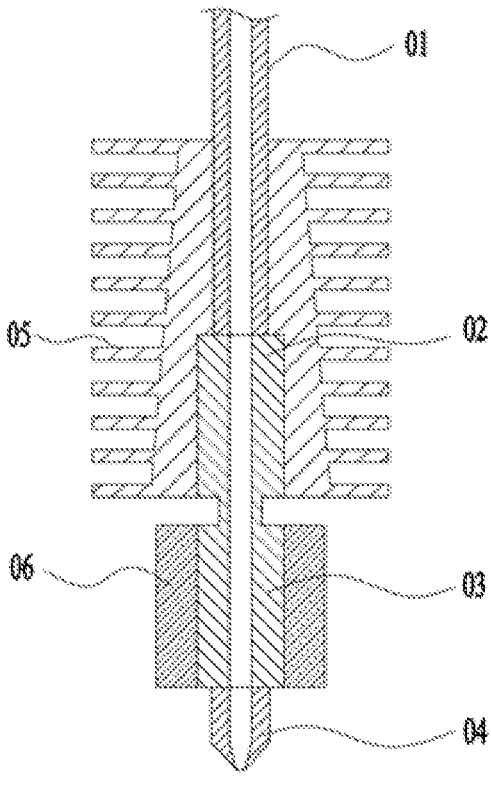
FIG. 1 is a structural schematic diagram of a printing nozzle.

The following description provides specific application scenarios and requirements of the present application, with the purpose of enabling a person skilled in the art to manufacture and use the contents of the present application. Various minor modifications to the disclosed embodiments may become apparent to a person skilled in the art. In addition, the general principles defined herein may be applied to other embodiments and applications without departing from the spirit and scope of the present application. Accordingly, the present application is not limited to the embodiments described herein, but is to be accorded the broadest scope consistent with the appended claims.

The terminology used herein is for the purpose of describing particular exemplary embodiments only, and is not intended to be limiting. For example, as used herein, the singular forms "a", "an" and "the" may also include the plural forms unless the context explicitly dictates otherwise. When used in this description, the terms "comprising", "including" and/or "containing" refer to that the associated integers, steps, operations, elements and/or components are present, but do not exclude the presence of one or more other features, integers, steps, operations, elements, components and/or groups in a system/method, or the addition of other features, integers, steps, operations, elements, components and/or groups to a system/method.

These and other features of this disclosure, as well as the operation and function of the relevant elements of the structure, and the economy of assembly and manufacture of the components, may be significantly enhanced in view of the following description. The description also includes all the figures and texts in the drawings referred to in this description, and all of which form part of this description. It should be understood, however, that the drawings are for purposes of illustration and description only, and are not intended to limit the scope of this description. It should also be understood that the figures are not drawn to scale.

3D printing provides a more cost-effective and automated manufacturing process, and enables digital inventory while providing greater flexibility in engineering design. Fused Filament Fabrication (FFF) is one of the most commonly used 3D printing techniques for thermoplastic polymers. In the FFF process, the hardware structure of a 3D printer generally includes a filament conveying device, a printing nozzle, a heating device, a nozzle driving device, a platform, and the like. The platform is used to place a base plate on which a model can be built. The filament conveying device feeds a thermoplastic filament (a type of filament) into the printing nozzle, and the heating device heats the filament at the printing nozzle to melt or liquefy the filament, and then the filament is extruded from an outlet of the printing nozzle and deposited on the base plate on which the model is built. The nozzle driving device drives the nozzle to move according to a preset trajectory to print out a required geometric shape. After the first layer of the model is printed, the platform descends in a vertical direction and/or the printing nozzle rises in the vertical direction, so as to print the second layer of the model on the basis of the first layer. The printing material of the second layer is then cured and bonded with the printing material of the first layer. In this way, the 3D printer can produce the required 3D geometrical shape after printing all the layers of the model.

A software system of the 3D printer is able to layer a 3D digital model and generate the model forming path and necessary support path for each layer.

As shown in FIG. 1, in some solutions of the printing nozzle, along a conveying direction of the filament, the structure of the printing nozzle includes: a filament conveying section 01, a throat heat dissipation section 02, a melting section 03, and a nozzle extrusion section 04. The filament in the filament conveying section 01 is at a normal temperature and retain in its original solid state. A heat dissipation device 05 is provided for the throat heat dissipation section 02 to prevent the heat of the melting section 03 from being transferred to the filament conveying section 01, so as to prevent the filament from softening in advance before future heating to cause plugging. The melting section 03 is provided with a heating device 06 for heating the filament, so that the filament gradually changes from the solid state to a viscous fluid state. The nozzle extrusion section 04 is used to print and extrude the viscous filament. The heating efficiency of the printing nozzle is one of the core technical bottlenecks that limit the FFF printing speed.

In order to improve the heating efficiency of the printing nozzle, one solution is to increase the length of the melting section 03. Another solution is to increase the heating power of the heating device 06 at the melting section 03.

However, if the length of the melting section 03 is increased, the melting area of the printing material will become longer, resulting in a decrease in the controllability of the extrusion flow. For example, when the 3D printing nozzle is retracting in idling, an increase in the length of the conveying pipe of the filament at the melting section 03 may prevent the retraction force from effectively acting on the molten printing material near the nozzle, resulting in part of the printing material overflowing from the nozzle.

If the heating power of the heating device 06 at the melting section 03 is increased, the heating temperature of the melting section 03 becomes higher, which may raise the temperature of the liquid printing material. Since there is a gap between a through hole of the throat and the conveyed filament, after being pressed, the melted printing material in the melting section 03 is extruded from the nozzle extrusion section 04, yet a portion of the printing material may flow back through the gap at its rear end. Thus, if the temperature of this portion of the printing material is too high, the heat dissipation device 05 at the throat heat dissipation section 02 cannot sufficiently dissipate the heat, preventing the printing material from solidifying quickly, and thus resulting a very long flowing back distance of this portion of the printing material and excessive friction between the printing material and an inner wall of the through hole of the throat, thereby causing plugging.

In view of the foregoing, some embodiments of the present application provide a 3D printing nozzle, a 3D printer, and a printing method, which can effectively improve the heating and plasticizing capability of the 3D printing nozzle without increasing the length and heating temperature of the melting section 03, thereby improving the printing speed of the 3D printer.

Figure 2:
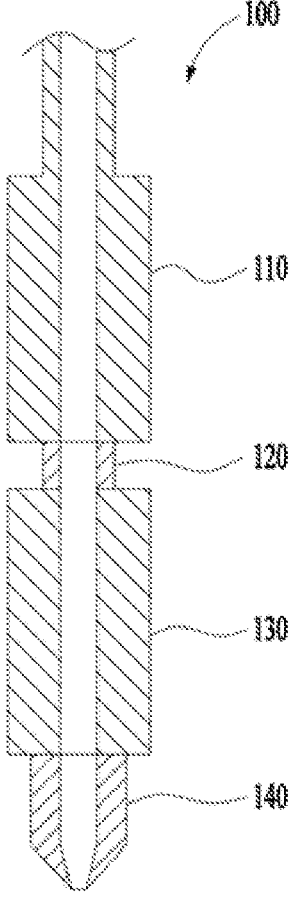
FIG. 2 is a schematic diagram of a partial structure of a 3D printing nozzle provided in some embodiments of the present application.
Figure 3:
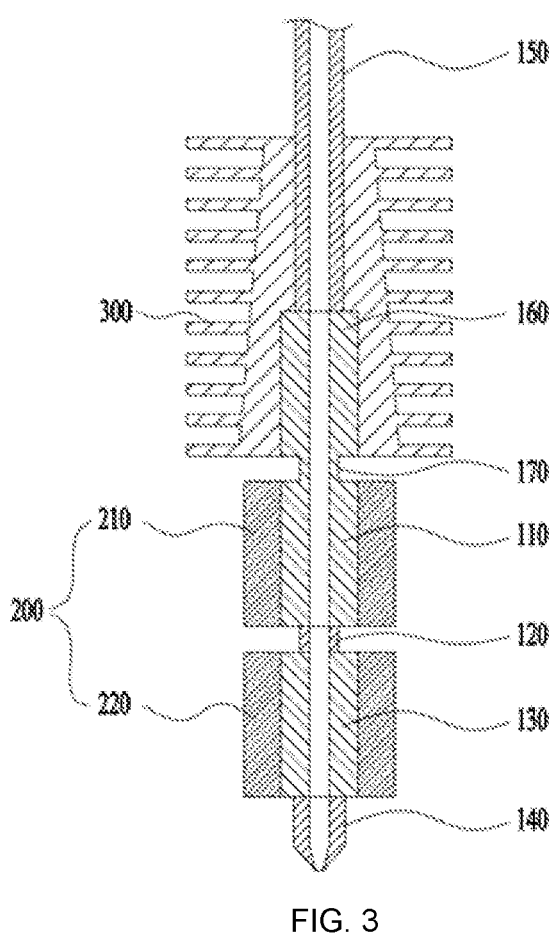
FIG. 3 is a schematic diagram of an overall structure of a 3D printing nozzle provided in some embodiments of the present application.

FIGS. 2 and 3 show a 3D printing nozzle. The 3D printing nozzle includes a nozzle body 100, and a heating device 200 disposed on the nozzle body 100. The nozzle body 100 sequentially includes at least a preheating section 110, a first heat resistance section 120, and a melting section 130 along a target direction. When the 3D printer is in operation, the nozzle body 100 conveys and extrudes a printing material along the target direction.

The heating device 200 can heat the preheating section 110 and the melting section 130 respectively. When heating the preheating section 110, the heating temperature of the heating device 200 may be set as T1. The temperature T1 is lower than the melting temperature of the printing material. Accordingly, the printing material remains in a solid state when passing through the preheating section 110 at the temperature T1. Therefore, when the printing material is conveyed to the preheating section 110, the heating device 200 can heat the normal temperature printing material to raise its temperature, but still keep the printing material in the solid state in this stage. The heating temperature of the heating device 200 at the melting section 130 can be set as T2. The printing material turns into a molten state, that is, a fluid state, when passing through the melting section 130 at the temperature T2. Apparently, the temperature T2 is higher than the temperature T1. When the printing material is conveyed to the melting section 130, the heating device 200 can reheat the preheated printing material to further raise the temperature of the printing material until the printing material turns into a fluid state (i.e., a liquid state). The printing material transformed into the fluid state is finally extruded from the nozzle 140.

Since the heating temperature T2 of the melting section 130 is higher than the heating temperature T1 of the preheating section 110, according to the law of thermodynamics, heat will flow from the melting section 130 to the preheating section 110, which may cause the printing material in the preheating section 110 to have a risk of softening. For this reason, a first heat resistance section 120 is provided between the melting section 130 and the preheating section 110 to limit the heat transfer between the melting section 130 and the preheating section 110, so that the printing material in the preheating section 110 can always stay in the solid state. This can prevent the plugging issue of the printing material caused by premature softening.

It should be noted that, macroscopically, the solid state herein refers to a state in which the printing material has a fixed volume and shape; the liquid state herein refers to a state in which the printing material has a certain volume but has no fixed shape, and can flow. Moreover, the solid and liquid states herein may also be defined from the perspective of viscoelasticity generally exhibited by polymers, that is, with a dynamic mechanical frequency of 1 Hz and in the viscoelastic linear region, the printing material in the solid state exhibits a dynamic mechanical loss (Tan σ)<1; the printing material in the liquid state exhibits a dynamic mechanical loss (Tan σ)>1. Furthermore, the elastic modulus of the solid state printing material can be selected to be greater than or equal to 1 MPa, and further selected to be greater than or equal to 10 MPa.

The 3D printing nozzle provided in the embodiments of the present application restricts the heat conduction between the preheating section 110 and the melting section 130 by providing a heat insulation section, so that the preheating section 110 and the melting section 130 can be effectively maintained at their respective heating temperatures, thereby realizing the segmental heating of the printing material. The preheating section 110 preheats the printing material, and the heating temperature set for the corresponding heating device 200 is T1. At this temperature, the printing material has a raised temperature yet still remains in a solid state, thereby ensuring that the printing material is conveyed in a solid state before entering the melting section 130, and effectively preventing the material in the melting section 130 from overflowing from the nozzle and flowing back into the preheating section 110 when the 3D printing nozzle is retracted in an idling state. When the printing material is conveyed to the melting section 130, the melting section 130 with the temperature T2 can further heat the printing material to transform it into a fluid state, in addition, since the temperature of the printing material has been raised previously in the preheating section 110, the heat absorption and melting time required for the printing material per unit mass to be heated and melted in the melting section 130 can be reduced, thereby improving the melting efficiency of the printing material.

It should be noted that the above embodiment provides a specific example of two-stage heating. However, the scope of protection of the present application is not limited thereto. For the segmental heating of the printing nozzle, a person skilled in the art may also choose to use three-stage heating, four-stage heating, five-stage heating, etc., with adjacent two heating sections separated by a heat resistance section. With the increase of the number of heating sections, the setting of the heating temperature of each heating section can be finer, so as to realize the precise control of the heating temperature of the printing material.

There are many options for the printing material, such as semi-crystalline polymers and non-crystalline polymers. When a semi-crystalline polymer is selected as the printing material, the heat-resistant temperature of the semi-crystalline polymer is greatly increased after crystallization treatment, which can prevent the filament from softening in advance at the throat, and prevent the occurrence of plugging. In addition, the substantial increase in the softening temperature of the filament provides a wider material heating temperature range, which enables the filament to have a better heating potential while maintaining its solid conveying characteristics, thus providing a wider temperature setting range for the segmental heating.

According to some embodiments of the present application, the printing material may be a semi-crystalline polymer with the crystallinity greater than zero. The highest melting point of the semi-crystalline polymer is Tm, and T1, T2 and Tm satisfy the following relationship: T1<Tm≤T2. Therefore, when setting the heating temperature of the heating device 200, it can be set with reference to the highest melting point Tm of the printing material.

It should be noted that when the printing material has multiple crystal forms, or is a blend system of two or more polymers, the printing material may have multiple melting points. In such a case, the above-mentioned highest melting point refers to the highest melting point when the printing material has one or more melting points.

When the printing material is selected to be a non-crystalline polymer or a non-crystalline polymer blend, the heating method described in the above embodiment is also applicable to these cases. The softening temperature of a non-crystalline polymer is near its glass transition temperature Tg. In this regards, the heating temperature T1 of the preheating section 110 and the heating temperature T2 of the melting section 130 are typically set close to the Tg, which can achieve a similar effect. For example, T1, T2 and Tg satisfy the following relationship: T1<Tg≤T2.

Moreover, the printing material can also be selected as a non-crystalline polymer blend. When the printing material is a blend of non-crystalline polymers, the glass transition temperature Tg herein is the highest glass transition temperature of the non-crystalline polymers in the blend.

For example, the printing material may include one or more of the following materials: polylactic acids (PLA), polyamides (PA), polyethylene terephthalates (PET), polyolefins, thermoplastic polyesters, polycarbonates (PC), polyurethanes (PU), polyphenylene sulfides (PPS), polyphenylene oxides (PPO), polyoxymethylenes (POM), polysulfones (PSF), polyimides (PI), polyetherether ketones (PEEK), liquid crystal polymers (LCP), and copolymers of the foregoing.

The heating device 200 can heat the printing nozzle in various ways. For example, the heating device 200 may adopt a resistance heater, which uses the thermal effect of the current passing through a resistance body to electrically heat the material. The resistance heater has a large heating temperature range, uniform heating effect, high thermal efficiency, and less environmental pollution.

In another example, the heating device 200 may be a radiant heater, which employs electric infrared radiation or electric infrared heating to utilize the infrared radiation generated by electric energy to transfer heat energy. The infrared radiation of a radiant heater can penetrate to a certain depth from the surface of a heated material, but basically does not heat the air and media in the heating space. Therefore, it has the advantages of high thermal efficiency, fast heating speed, low power consumption, high heating quality, and good working environment.

In yet another example, the heating device 200 may be an electromagnetic heater. Electromagnetic heating may also be referred to as electromagnetic induction heating. Electromagnetic heating (EH) is a heating technology that can convert electrical energy into heat energy based on the principle of electromagnetic induction. Therefore, the use of electromagnetic heating requires that the tube material of the preheating section 110 and the melting section 130 of the nozzle be made of a metal(s), or the printing material contains a metal component(s), such as metal powder. The electromagnetic heater has a high thermal conversion rate, is safe and energy-saving, and has a long service life.

It should be noted that the heating device 200 may be a single heating device or multiple heating devices. When a single heating device 200 is used, the single heating device 200 can be used to heat multiple nozzle sections simultaneously. In such a case, the heating temperature may be controlled by designing the various sections to be formed by different materials. For example, the thermal conductivity of the material of the preheating section 110 may be designed to be lower than the thermal conductivity of that of the melting section 130. Thus, when the same heating device 200 is used to heat the preheating section 110 and the melting section 130 simultaneously, even though the heating temperature is the same, yet because the thermal conductivity of the material of the preheating section 110 is lower than that of the melting section 130, in addition, the printing material is in the state of being conveyed along the target direction, within a limited time period, the heating temperature of the printing material in the preheating section 110 is always lower than the heating temperature of the printing material in the melting section 130, so as to realize the segmental heating effect of the printing nozzle.

In addition, the heating device 200 may actually include a plurality of heating devices 200. As shown in FIG. 3, the heating device 200 may include a first heating device 210 and a second heating device 220. In this case, the first heating device 210 is connected to the preheating section 110, and is configured to heat the preheating section 110 to a temperature T1. The second heating device 220 is connected to the melting section 130, and is configured to heat the melting section 130 to a temperature T2.

It should be noted that the first heating device 210 and the second heating device 220 may use the same heating method or different heating methods. For example, when the first heating device 210 adopts radiation heating, the second heating device 220 may also adopt radiation heating, or may adopt resistance heating or electromagnetic heating.

As shown in FIG. 3, other parts of the nozzle body 100 may further include a conveying section 150, a heat dissipation section 160, and a second heat resistance section 170, sequentially connected along the target direction. The second heat resistance section 170 is connected to the preheating section 110. Thus, when the 3D printer is turned on and in operation, the printing material is conveyed sequentially through the conveying section 150, the heat dissipation section 160, the second heat resistance section 170, the preheating section 110, the first heat resistance section 120, and the melting section 130; finally, it is extruded from an outlet of the nozzle 140.

The filament in the conveying section 150 is at a normal temperature and kept in the original solid form for conveying. The heat dissipation section 160 is provided with a heat dissipation device 300 (such as a heat dissipation fin). Since there is a gap between a feeding channel of the nozzle body 100 and the printing material, when the printing material melted by the melting section 130 is pressed, part of it may flow back through the aforementioned gap. If the backflow distance is too long, the friction between the printing material and the feeding channel may increase, and the 3D printing nozzle is prone to clogging. Therefore, the heat dissipation device 300 provided for the heat dissipation section 160 can make the reversed printing material solidify rapidly or the viscosity of the reversed printed material increase rapidly, so as to increase the resistance of the reversed flow, and prevent the reversed flow distance from being too long. The second heat resistance section 170 may limit the heat conduction between the preheating section 110 and the heat dissipation section 160 to prevent the temperature of the printing material in the heat dissipation section 160 from exceeding a preset temperature.

In order to achieve the purpose of limiting heat transfer, there are many ways to realize the first heat resistance section 120 and the second heat resistance section 170. The first heat resistance section 120 is taken as an example below to illustrate several possible implementations, respectively. The implementation of the second heat resistance section 170 can be considered similarly.

For example, the first heat resistance section 120 may block heat transfer by reducing the thermal conductivity. In one case, the thermal conductivity of the first heat resistance section 120 may be lower than that of the preheating section 110 and lower than that of the melting section 130. Specifically, the thermal conductivity of the first heat resistance section 120 may be lower than the thermal conductivity of the melting section 130 and the preheating section 110 by 10 W/m·K. That is, the difference between the thermal conductivity of the first heat resistance section 120 and the thermal conductivity of the melting section 130 is greater than or equal to 10 W/m·K. Further, the difference between the thermal conductivity of the first heat resistance section 120 and the thermal conductivity of the melting section 130 may be greater than or equal to 50 W/m·K. Furthermore, the difference between the thermal conductivity of the first heat resistance section 120 and the thermal conductivity of the melting section 130 may be greater than or equal to 100

W/m·K. As a result, the heat conduction capability of the first heat resistance section 120 can be significantly reduced, thereby blocking the heat transfer between the preheating section 110 and the melting section 130.

In order to reduce the thermal conductivity of the first heat resistance section 120, the first heat resistance section 120 may be made of a material with low thermal conductivity. For example, the first heat resistance section 120 may be made of an inorganic non-metallic material. Specifically, the material of the first heat resistance section 120 may include one or more of the following materials: marble, glass, and ceramics.

In order to make the thermal conductivity of the preheating section 110 and the melting section 130 higher, one or more of the following materials may be used to make the preheating section 110 and the melting section 130: copper, copper alloys, aluminum, aluminum alloys, and carbon materials.

In another case, a method of reducing the outer diameter of the first heat resistance section 120 may be used to block heat transfer. For example, the outer diameters of both ends of the first heat resistance section 120 may be larger than the outer diameter of its middle portion, and the two ends of the first heat resistance section 120 are respectively connected to the preheating section 110 and the melting section 130. Specifically, a throat can be used to block heat transfer. In such a case, the material of the first heat resistance section 120 may be the same as or different from the material(s) of the preheating section 110 and the melting section 130.

It should be noted that the above middle portion refers to the part between the two ends of the first heat resistance section 120; the specific size and specific length of the middle portion and the position of the middle point of the middle portion are not limited herein.

In yet another case, the heat transfer may also be blocked by extending the distance between the preheating section 110 and the melting section 130. For example, the length of the first heat resistance section 120 can be set to be sufficient to block most of the heat transfer. For example, the length range of the first heat resistance section 120 may be selected to be greater than or equal to 0.2 mm. That is, the distance between the preheating section 110 and the melting section 130 is greater than or equal to 0.2 mm. Further, the length range of the first heat resistance section 120 may be selected to be greater than or equal to 1 mm. That is, the distance between the preheating section 110 and the melting section 130 is greater than or equal to 1 mm. Furthermore, the length range of the first heat resistance section 120 may be selected to be greater than or equal to 2 mm. That is, the distance between the preheating section 110 and the melting section 130 is greater than or equal to 2 mm.

It should be noted that, only one of the above implementation manners of the first heat resistance section 120 may be selected, or two or three of them may be adopted in combination. For example, the length of the first heat resistance section 120 may be extended while reducing the outer diameter of the first heat resistance section 120, and meanwhile, the first heat resistance section 120 may be made of a material with low thermal conductivity.

In addition to the 3D printing nozzle described above, some embodiments of the present application further provide a 3D printer, which includes the 3D printing nozzle as described in any embodiment of the first aspect.

Furthermore, the hardware structure of the 3D printer may further include a filament conveying device, a nozzle driving device, a platform, and the like. The platform is used to place the base plate on which a model can be built. The filament conveying device feeds the printing material to the printing nozzle, and the heating device 200 then heats the printing material in the printing nozzle to melt or liquefy the printing material, which is then extruded from the outlet of the printing nozzle and deposited on the base plate for building the model. The nozzle driving device is used to drive the printing nozzle to move according to a preset trajectory to print out the required geometric shape. After the model printing of the first layer is completed, the platform is lowered vertically or the printing nozzle is raised vertically to print the second layer on the basis of the first layer. The printing material of the second layer can be cured and bonded with the printing material of the first layer. In this way, after the model printing of all layers is completed, the required 3D geometric shape is formed.

The software system of the 3D printer is used to layer a 3D digital model and generate the model forming path and necessary support path for each layer.

The 3D printer provided in some embodiments of the present application adopts the 3D printing nozzle described in any embodiment of the first aspect, such that it can reduce the heat absorption and melting time required for the printing material per unit mass to be heated and melted in the melting section 130, thereby improving the melting efficiency of the printing material.

In addition to the above-mentioned 3D printing nozzle and 3D printer, some embodiments of the present application also provide a method for a 3D printer to heat and print a printing material. FIG. 4 shows a printing method 200 of a 3D printer according to some embodiments of the present application. The printing method 200 includes the following steps:

S210: sequentially conveying a printing material into a preheating section 110, a first heat resistance section 120, and a melting section 130 of a printing nozzle of a 3D printer along a target direction, and extruding the printing material from a nozzle of the printing nozzle. The nozzle herein of the above-mentioned printing nozzle refers to an outlet from which the printing nozzle outputs the printing material. The specific technical details of this step have been described previously, and will not be repeated herein.

S220: setting a heating temperature of the preheating section 110 to a temperature T1, so that the printing material remains in a solid state when passing through the preheating section 110. The specific technical details of this step have been described previously, and will not be repeated herein.

S230: setting a heating temperature of the melting section 130 to a temperature T2, so that the printing material in the melting section 130 is heated to a fluid state, where the first heat resistance section 120 restricts heat conduction between the preheating section 110 and the melting section 130, so that the printing material in the preheating section 110 remains in the solid state. The specific technical details of this step have been described previously, and will not be repeated herein.

According to the printing method of the 3D printer provided in some embodiments of the present application, the printing material is preheated in the preheating section 110, and the heating temperature set for the corresponding heating device 200 is T1; the temperature of the printing material can be raised to this temperature, yet the printing material still remains in a solid state, thereby ensuring that the printing material is conveyed in a solid state before entering the melting section 130, which can effectively avoid the material in the melting section 130 from overflowing from the nozzle and flowing back into the preheating section 110 when the 3D printing nozzle is retracted in an idling state. When the printing material is conveyed to the melting section 130, since its temperature has been raised previously, the heat absorption required by the unit mass of the printing material in the melting section 130 can be reduced, and the time for the printing material to be heated and melted in the melting section 130 is also shortened, thereby increasing the printing speed. In addition, since the first heat resistance section 120 is provided between the preheating section 110 and the melting section 130, the preheating section 110 and the melting section 130 can be effectively maintained at respective heating temperatures, which can prevent the heating temperatures of the preheating section 110 and the melting section 130 from influencing each other, so as to accurately realize the segmental heating of the printing filament.

For example, when the printing material is a semi-crystalline polymer with a crystallinity of greater than 0; the semi-crystalline polymer has a maximum melting point of Tm; and the T1, T2, and Tm satisfy the following relationship: $T1<Tm \leq T2$.

The difference between the highest melting point Tm and T1 can be selected within the following range: $5° C. \leq (Tm-T1) \leq 50° C.$ If the difference between Tm and T1 is too large, the preheating of the printing material may be insufficient, and the printing speed cannot be increased significantly. If the difference between Tm and T1 is too small, it may lead to premature softening of the printing material and increase the risk of plugging. Therefore, selecting the difference between Tm and T1 within the above range can not only ensure sufficient preheating of the printing material, but also prevent the printing material from softening in advance. This can improve the printing speed of the 3D printer while preventing plugging. When the printing material is a non-crystalline polymer; the non-crystalline polymer has a maximum glass transition temperature of Tg; and the T1, T2, and Tg satisfy the following relationship: $T1<Tg \leq T2$.

For example, the printing material may include one or more of the following materials: polylactic acids (PLA), polyamides (PA), polyethylene terephthalates (PET), polyolefins, thermoplastic polyesters, polycarbonates (PC), polyurethanes (PU), polyphenylene sulfides (PPS), polyphenylene oxides (PPO), polyoxymethylenes (POM), polysulfones (PSF), polyimides (PI), polyetherether ketones (PEEK), liquid crystal polymers (LCP), and copolymers of the foregoing.

The foregoing describes some specific embodiments of the present application. Other embodiments are also within the scope of the appended claims. In some cases, the actions or steps recited in the claims may be performed in an order different from that in these embodiments and can still achieve desired results. In addition, the processes illustrated in the accompanying drawings do not necessarily require the particular order shown or a continuous sequence in order to achieve the desired results. Multitasking and parallel processing may also be possible or even advantageous in certain embodiments.

In summary, upon reading this detailed disclosure, a person skilled in the art can understand that the foregoing detailed disclosure may be merely presented by way of example, and may not be limiting. Although not explicitly stated herein, a person skilled in the art can understand that this description should cover various reasonable changes, improvements and modifications to the embodiments; these changes, improvements and modifications are intended to be derived from this description, and are within the principles and scope of the embodiments of this disclosure.

In addition, certain terms in this disclosure have been used to describe some exemplary embodiments of this disclosure. For example, "one embodiment," "an embodiment" and/or "some embodiments" refer to that a particular feature, structure or characteristic described in connection with the embodiment(s) can be included in at least one embodiment of the disclosure. Thus, it is emphasized and should be understood that two or more references to "an embodiment", "one embodiment" or "an alternative embodiment" in various portions of this disclosure are not necessarily all referring to the same embodiment. Also, specific features, structures or characteristics may be properly combined in one or more embodiments of the present disclosure.

It should be understood that in the foregoing description of the embodiments of the present disclosure, in order to facilitate the understanding of one feature, for the purpose of simplifying the disclosure, various features may be combined in a single embodiment, drawing or description thereof. However, this does not mean that such a combination of these features is necessary; it is certainly possible for a person skilled in the art to extract some of the features as separate embodiments based on this disclosure. That is to say, one embodiment in this disclosure can also be understood as the combination of multiple sub-embodiments. It is also true that each sub-embodiment can have fewer features than all of the features of one preceding embodiment disclosed.

Each patent, patent application, publication of a patent application, and other materials, such as articles, books, specifications, publications, documents, articles, etc., cited herein, except for any historical prosecution documents to which it relates, which may be inconsistent with or any identities that conflict, or any identities that may have a restrictive effect on the broadest scope of the claims, are hereby incorporated by reference for all purposes now or hereafter associated with this document. Furthermore, in the event of any inconsistency or conflict between the description, definition, and/or use of a term associated with any contained material, the term used in this document shall prevail.

Finally, it should be understood that the embodiments of the application disclosed herein are illustrative of the principles of the embodiments of the disclosure. Other modified embodiments are also within the scope of this disclosure. Therefore, the embodiments disclosed herein are only illustrative and not restrictive. A person skilled in the art may implement the applications in this disclosure by adopting alternative configurations according to the embodiments in this disclosure. Therefore, the embodiments of the present disclosure are not limited to the embodiments explicitly described in the disclosure.

What is claimed is:

1. A 3D printing nozzle, comprising:

a nozzle body, being configured to convey and extrude a printing material along a target direction during operation, and sequentially comprising one preheating section, a first heat resistance section, and a melting section along the target direction, wherein the first heat resistance section comprises a first end and a second end, the first end is connected to the preheating section and the second end is connected to the melting section to restrict heat conduction between the preheating section and the melting section; and a heating device, connected to the nozzle body, being configured to heat the preheating section to a temperature T1 to keep the printing material in a solid state and to heat the melting section to a temperature T2 to turn the printing material to a fluid state during the operation, wherein outer diameters of two ends of the first heat resistance section are larger than an outer diameter of a middle portion of the first heat resistance section; and the two ends of the first heat resistance section are respectively connected to the preheating section and the melting section.

2. The 3D printing nozzle according to claim 1, wherein the printing material is a semi-crystalline polymer with a crystallinity of greater than 0;

the semi-crystalline polymer has a maximum melting point of $T_m$; and the T1, the T2, and the $T_m$ satisfy the following relationship: $T1 < T_m \leq T2$.

3. The 3D printing nozzle according to claim 1, wherein the printing material is a non-crystalline polymer;

the non-crystalline polymer has a maximum glass transition temperature of $T_g$; and the T1, the T2, and the $T_g$ satisfy the following relationship: $T1 < T_g \leq T2$.

4. The 3D printing nozzle according to claim 1, wherein the printing material comprises at least one of polylactic acids, polyamides, polyethylene terephthalates, polyolefins, thermoplastic polyesters, polycarbonates, polyurethanes, polyphenylene sulfides, polyphenylene oxides, polyoxymethylenes, polysulfones, polyimides, polyetherether ketones, liquid crystal polymers, or copolymers of the foregoing.

5. The 3D printing nozzle according to claim 1, wherein the heating device is at least one of a resistance heater, a radiation heater, or an electromagnetic heater.

6. The 3D printing nozzle according to claim 1, wherein the heating device comprises:

a first heating device, connected to the preheating section, and configured to heat the preheating section to the temperature T1; and a second heating device, connected to the melting section, and configured to heat the melting section to the temperature T2.

7. The 3D printing nozzle according to claim 1, wherein a difference between the thermal conductivity of the first heat resistance section and the thermal conductivity of the melting section is greater than or equal to 10 W/m·K.

8. The 3D printing nozzle according to claim 1, wherein a material of the first heat resistance section comprises at least one of inorganic non-metallic materials or organic polymer materials; and materials of the preheating section and the melting section comprise at least one of metal materials, metal alloys, or carbon materials.

9. The 3D printing nozzle according to claim 1, wherein a length of the first heat resistance section is greater than or equal to 1 mm.

10. The 3D printing nozzle according to claim 1, wherein the nozzle body further comprises a conveying section and a second heat resistance section connected sequentially along the target direction, wherein the second heat resistance section is connected to the preheating section, and when the 3D printing nozzle is in the operation, the printing material is sequentially conveyed through the conveying section, the second heat resistance section, the preheating section, the first heat resistance section, and the melting section, and is finally extruded from an outlet.

11. The 3D printing nozzle according to claim 10, wherein the conveying section and the second heat resistance section are connected by a heat dissipation section; and a heat dissipation device is connected to the heat dissipation section.

12. The 3D printing nozzle according to claim 11, wherein outer diameters of two ends of the second heat resistance section are larger than an outer diameter of a middle portion of the second heat resistance section; and the two ends of the second heat resistance section are respectively connected to the preheating section and the heat dissipation section.

13. The 3D printing nozzle according to claim 1, wherein a thermal conductivity of the first heat resistance section is lower than a thermal conductivity of the preheating section and is lower than a thermal conductivity of the melting section.

14. A 3D printer, comprising:

a nozzle, comprising:

a nozzle body, being configured to convey and extrude a printing material along a target direction during operation, and sequentially comprising one preheating section, a first heat resistance section, and a melting section along the target direction, wherein the first heat resistance section comprises a first end and a second end, the first end is connected to the preheating section and the second end is connected to the melting section to restrict heat conduction between the preheating section and the melting section; and a heating device, connected to the nozzle body, being configured to heat the preheating section to a temperature T1 to keep the printing material in a solid state and to heat the melting section to a temperature T2 to turn the printing material to a fluid state during the operation; and a filament conveying device to feed the printing material to the printing nozzle, wherein outer diameters of two ends of the first heat resistance section are larger than an outer diameter of a middle portion of the first heat resistance section; and the two ends of the first heat resistance section are respectively connected to the preheating section and the melting section.

* * * * *